(No Model.)

T. E. ANDERSON.
ANIMAL TRAP.

No. 590,032. Patented Sept. 14, 1897.

Witnesses
E. C. Wurdman
J. H. Williamson

Inventor
Thomas E. Anderson
by Geo. H. Holgate
Attorney

UNITED STATES PATENT OFFICE.

THOMAS E. ANDERSON, OF MEMPHIS, TENNESSEE.

ANIMAL-TRAP.

SPECIFICATION forming part of Letters Patent No. 590,032, dated September 14, 1897.

Application filed June 15, 1897. Serial No. 640,827. (No model.)

*To all whom it may concern:*

Be it known that I, THOMAS E. ANDERSON, a citizen of the United States, residing at Memphis, in the county of Shelby and State of Tennessee, have invented a certain new and useful Improvement in Animal-Traps, of which the following is a specification.

My invention relates to a new and useful improvement in animal-traps, and has for its object to provide a simple, cheap, and effective device by means of which rats or other animals may be entrapped without actuating mechanism, and when so entrapped will be unable to escape from the inclosure, and yet when it is desired to remove the animal from the trap this may be quickly done without an additional opening by removing the spiked funnel-shaped opening, which may be thereafter replaced and secured in position.

A further object of my invention is to provide for the entrapping of a number of animals, those already entrapped in no wise interfering with the free entrance of others.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1:
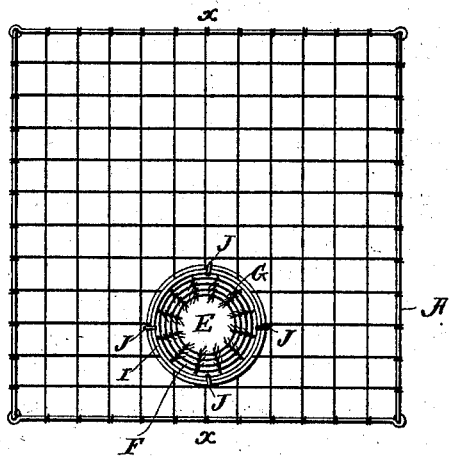
Figure 2:
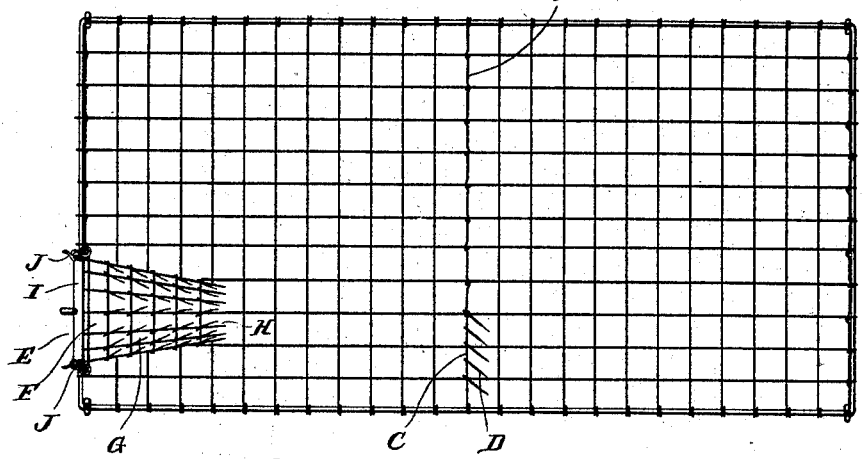
Figure 3:
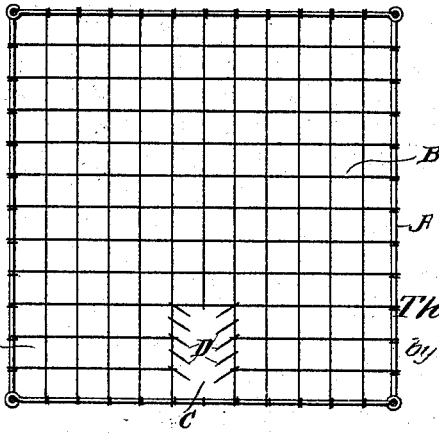

Figure 1 is an end view of a trap made in accordance with my improvement; Fig. 2, a longitudinal section at the line $xx$ of Fig. 1, and Fig. 3 a detail section showing the opening through the partition.

In carrying out my invention as here embodied I form the body of the trap A by the proper arrangement of interlaced wires or of other suitable material, and the inclosure therein is subdivided into compartments by the partition B. Through this partition is an opening C, having a series of spikes D, so set that when an animal passes through this opening from one compartment to the other it will be impossible for it to repass to the former opening. By this arrangement when an animal has been trapped in the first compartment its desire to escape will cause it to pass through the opening C, and in this direction the spikes D will not hinder its passage, but after it has once passed to the second compartment it cannot again, as before stated, repass to the first compartment.

A circular opening E is formed in the front end of the trap, and in this is secured the funnel-shaped entrance F, which is preferably composed of wire having projecting from the inner portion thereof a series of spikes G, all of which are set at such an angle and so bounded that an animal may readily pass through this entrance, but cannot move backward after having once entered, so that it will be compelled to continue its inward movements until gaining access to the first compartment of the trap, after which the spiked ends H of the entrance will preclude the possibility of the animal gaining its freedom.

The funnel is provided with a stay-ring I to hold it in proper shape, and this ring is also utilized for securing the funnel in place within the opening E by means of latch-hooks J. Thus when an animal has been entrapped it may be removed from the trap by the previous removal of the funnel, and this is accomplished by unhooking the latches J.

In practice it will be seen that when the trap is of a convenient size a large number of animals, such as rats, may be caught, one after the other, since those that first gain access to the first compartment will, as before described, pass to the second compartment, leaving the first compartment free for the entrance of other animals, and the mere fact that one or more such animals have been previously entrapped will tend to lead others to and into the trap, and this is especially true where the first compartment is left free for the entrance of other animals.

It is preferable that both the spikes C and G be made flexible, in order that they will give for the free passage of the animal in one direction, but will thereafter spring inward so as to pierce the animal upon its attempt to retrace its movements.

For convenience in removing an animal from the trap after it has been caught and passed into the inner compartment through the partition said partition may be removed and secured in place by suitable latches, or a suitable opening may be made in the opposite end of the cage for that purpose.

Having thus fully described my invention, what I claim as new and useful is—

In a device of the character described, a trap consisting of a wire frame, interwoven wires forming the walls of the trap, one end of said trap having a circular opening therethrough, a funnel-shaped entrance consisting of a series of wire rings each smaller than the one preceding, longitudinal wires secured to the rings, and spikes secured around each of said rings and projecting inwardly and rearwardly, a stay-ring provided around the larger end of the funnel, and latch-hooks secured around the circular opening, said funnel being adapted to be fitted within said opening so that the stay-ring will be engaged by the latch-hooks in a manner to be readily removable, substantially as described.

In testimony whereof I have hereunto affixed my signature in the presence of two subscribing witnesses.

THOMAS E. ANDERSON.

Witnesses:
CHARLES W. THOMPSON,
J. D. ANDERSON.